B. C. REYNOLDS.
FRUIT PRESS.
APPLICATION FILED APR. 5, 1917.
1,260,053.
Patented Mar. 19, 1918.
2 SHEETS—SHEET 1.
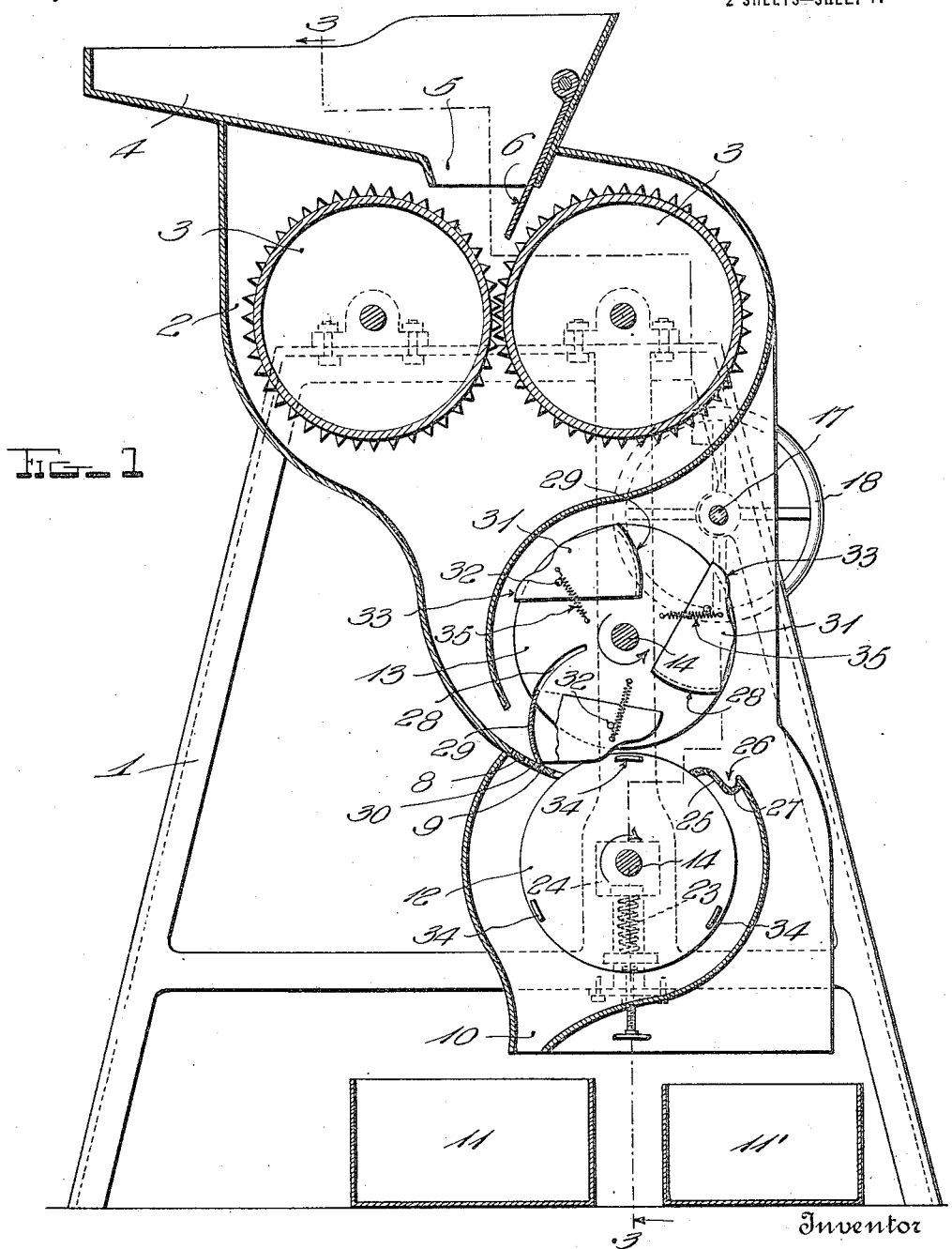
Witness
Inventor
Barney C. Reynolds
By
Attorneys.

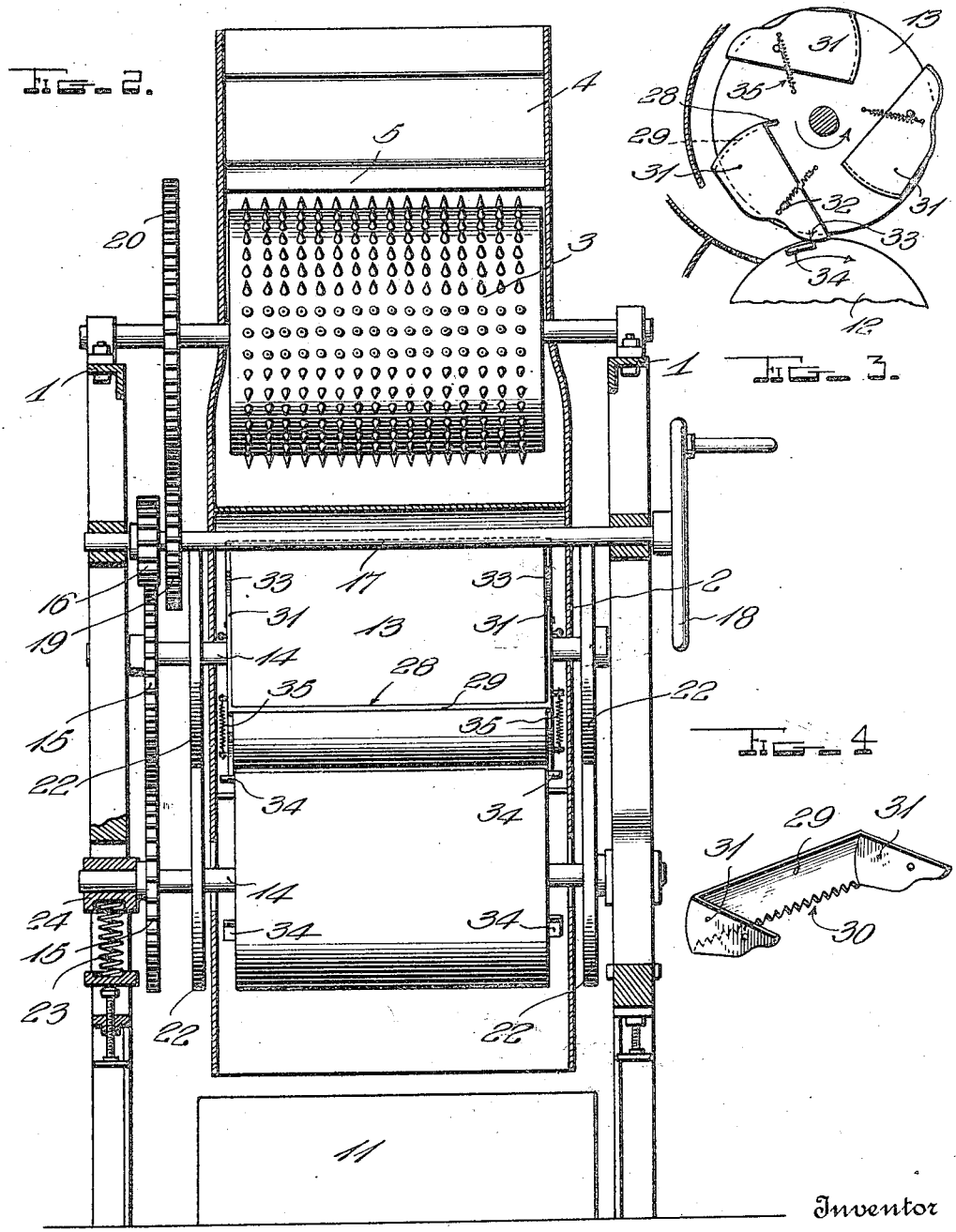

UNITED STATES PATENT OFFICE.

BARNEY C. REYNOLDS, OF TACOMA, WASHINGTON.

FRUIT-PRESS.

1,260,053.　　　　　　　Specification of Letters Patent.　　Patented Mar. 19, 1918.

Application filed April 5, 1917. Serial No. 159,958.

*To all whom it may concern:*

Be it known that I, BARNEY C. REYNOLDS, a citizen of the United States, residing at Tacoma, in the county of Pierce and State of Washington, have invented certain new and useful Improvements in Fruit-Presses; and I do declare the following to be a full, clear, and exact description of the invention, such as will enable others skilled in the art to which it appertains to make and use the same.

My invention relates to that class of presses designed primarily for extracting juice from numerous kinds of fruit although it is to be understood that it could well be used for other purposes.

The principal object of the invention is to provide a press having novel means for feeding the fruit between a pair of pressing rolls, said feeding means being carried by one roll and automatically extensible and retractable at proper intervals for withdrawing the crushed fruit from a support and feeding it to the rolls as set forth.

With the foregoing general object in view, the invention resides in the novel features of construction and unique combinations of parts to be hereinafter fully described and claimed, the descriptive matter being supplemented by the accompanying drawings which constitute a part of this specification and in which:

Figure 1 is a vertical section of the improved press;

Fig. 2 is a vertical transverse section on substantially the planes designated by the line 3—3 of Fig. 1;

Fig. 3 is a detail end elevation of the pressing rolls showing more particularly the manner in which the scrapers of one are automatically projected onto the fruit support for withdrawing the crushed fruit from the latter; and Fig. 4 is a perspective view of one of said scrapers.

In the drawings above briefly described, the numerals 1 have reference to a pair of suitable end frames which support a housing 2 within which are located a pair of toothed fruit crushing rolls 3, while supported by the housing 2 is a hopper 4 for feeding the fruit or the like to said rolls, the outlet 5 of said hopper preferably having a suitable device 6 for controlling the amount of feed and for checking it altogether when desired.

The lower end of the housing 2 is contracted and provided with a downwardly and inwardly inclined support 8 upon which the fruit crushed by the rolls 3 is received, said support being preferably perforated as shown at 9 to permit the juice to drain therethrough into the outlet passage 10 beneath which a suitable receptacle 11 may be placed. The support 8 is in close proximity to a lower pressing roll 12 which coöperates with a similar upper roll 13 to extract all of the juice from the crushed fruit. The shafts 14 of the two rolls 12 and 13 are geared together by spur gears 15 of uniform size, and the uppermost of these gears is driven by a pinion 16 on a transverse drive shaft 17 equipped by preference with a hand wheel 18 whereby it may be rotated. Shaft 17 also carries a pinion 19 meshing with a spur gear 20 on the shaft of one of the rolls 3, and said gear 20 in turn meshes with a gear (not shown) on the shaft of the other roll 3. The two gears are preferably of different sizes in order that one roll 3 may be driven at a greater rate of speed than the other to bring the teeth of said rolls into play to exert a grinding action on the fruit, which insures that it be reduced to a plup.

Preferably though not necessarily, the ends of the shafts 14 are provided with wheels 22, the upper wheels contacting with the lower ones to space the rolls 12 and 13 a predetermined amount to permit the pulp to pass therethrough after the juice has been pressed therefrom. To prevent injury to the machine in case a stone or the like should be fed into the same through the hopper 4, the shaft 14 of roll 12 is yieldable downwardly against springs 23 which support its bearings 24.

As shown most clearly in Fig. 1, the roll 12 is located in the outlet passage 10 and the rear side of the latter is provided with a scraper 25 contacting yieldably with the periphery of said roll to remove the pulp therefrom after extracting of the juice, a trough 26 being preferably provided at the lower edge of said scraper to collect any of said juice which might possibly pass with the pulp between the two rolls. The bottom of trough 26 and the scraper 25 are shown as provided with perforations 27 through which the juice mentioned may drain into the passage 10.

The upper roll 13 is provided with a plurality of longitudinally extending slits 28 opening through its periphery and normally receiving therein scraping plates 29 as shown most clearly in Figs. 1 and 4, the outer edges of said plates being preferably toothed as indicated at 30. Throughout the greater part of each revolution of the roller 13, the plates 29 are received totally in the slits 28, but at the proper time, said plates are projected to the position shown in Fig. 1 to remove the crushed fruit from the support 8 and feed it between the two pressing rolls. To permit this operation, the plates 29 are mounted as described below.

Preferably flat arms 31 are joined at one end to the ends of the scraping plates 29 and at 32 are pivoted between their ends to the ends of roll 13, the ends of said arms remote from the plates 29 being shaped to form cams 33 adapted to be struck by projections 34 on the ends of the roll 12 as will be clear from Figs. 1 and 3. By this means, the plates 29 are initially started on their outward movement and they may either drop by gravity or be projected by springs such as those shown at 35. The springs 35 act on opposite sides of the pivots 32 to hold the scrapers 29 either in retracted or projected position as shown clearly in Fig. 1.

The operation of the improved machine is as follows: The fruit is fed between the crushing rolls 3 from the hopper 4 and is reduced to a pulp by these rolls, such pulp falling into the contracted lower end 7 of the housing 2 and resting on the support 8. From the support, any free juice will drain through the perforations 9 into the outlet passage 10. As the rolls 12 and 13 rotate in the direction of the arrows in Fig. 1, the projections 34 successively come in contact with the cams 33 of the scrapers 29 and the latter are thus projected sufficiently from the slits 28 to cause them to withdraw the collected pulp from the support 8 and feed it between the rolls 13 and 14 which extract all juice therefrom, this juice being all collected in the outlet passage 10 and carried to the receptacle 11, whereas the remaining pulp will be discharged over the rear end of said passage into a suitable container such as that shown at 11'. After the scrapers 29 have performed their functions, they are automatically returned to their normal positions within the slits 28 by contact with the lower roll 12.

By constructing the improved press in the manner shown and described, it will be highly efficient and durable regardless of the fact that it is of comparatively simple and inexpensive nature. On account of these advantages, the specific construction shown constitutes the preferred form of the machine, but it is to be understood that within the scope of the invention as claimed, numerous minor changes may be made without sacrificing the principal advantages.

I claim:

1. In a fruit press, the combination of fruit crushing means, a pair of pressing rolls below said means, a support for the crushed fruit adjacent said rolls, and projectable and retractable means pivotally mounted on one of said rolls for removing the fruit from said support and feeding it between said rolls.

2. In a fruit press, the combination of a pair of pressing rolls, a support for the fruit adjacent said rolls, a projectable and retractable scraper, arms carrying said scraper and pivoted to one of said rolls, and means for automatically operating said arms to project said scraper onto said support to cause it to remove the fruit from the latter and feed it between the rolls as said rolls rotate.

3. In a fruit press, the combination of a pair of pressing rolls, a support for the fruit adjacent said rolls, a projectable and retractable scraper carried by one of said rolls, and means carried by the other roll for automatically projecting said scraper onto said support to cause it to remove the fruit from the latter and feed it between the two rolls as said rolls rotate.

4. In a fruit press, the combination of upper and lower rolls, the upper roll being provided with a longitudinal slit opening through its periphery, a fruit support adjacent said rolls, a scraper normally confined in said slit, arms carrying said scraper and pivoted to the ends of said upper roll, and means on the other roll for coöperation with said arms for swinging them outwardly to project the scraper onto the support, said scraper then serving to remove the fruit from said support and to feed it between the two rolls.

5. In a fruit press, the combination of upper and lower rolls, the upper roll being provided with a longitudinal slit opening through its periphery, a fruit support adjacent said rolls, a scraper normally confined in said slit, arms carrying said scraper and pivoted to the ends of said upper roll, and projections on the lower roll for striking said arms and swinging them outwardly to project the scraper onto the support, said scraper then serving to remove the fruit from said support and to feed it between the two rolls.

In testimony whereof I have hereunto set my hand in the presence of two subscribing witnesses.

BARNEY C. REYNOLDS.

Witnesses:
M. E. MORROW,
W. M. MILLER.

Copies of this patent may be obtained for five cents each, by addressing the "Commissioner of Patents, Washington, D. C."